United States Patent [19]

Bussink et al.

[11] Patent Number: 4,537,930
[45] Date of Patent: Aug. 27, 1985

[54] COMPOSITION OF A POLYCARBONATE RESIN AND A SELECTIVELY HYDROGENATED COPOLYMER OF A VINYL AROMATIC COMPOUND AND AN OLEFINIC ELASTOMER

[75] Inventors: Jan Bussink, Bergen op Zoom; Johannes W. J. DeMunck, Huybergen; Petrus C. A. Marie van Abeelen, Gilze, all of Netherlands

[73] Assignee: General Electric Company, Pittsfield, Mass.

[21] Appl. No.: 454,366

[22] Filed: Dec. 29, 1982

Related U.S. Application Data

[63] Continuation of Ser. No. 225,102, Jan. 14, 1981, abandoned, Continuation-in-part of Ser. No. 833,364, Sep. 14, 1977, abandoned.

[51] Int. Cl.$^3$ .............................................. C08L 69/00
[52] U.S. Cl. ........................................ 524/505; 525/92
[58] Field of Search ...................... 525/67, 92; 524/505

[56] References Cited

U.S. PATENT DOCUMENTS

| | | | |
|---|---|---|---|
| 2,999,835 | 9/1961 | Goldberg | 260/42 |
| 3,281,383 | 10/1966 | Zelinski et al. | 260/23.7 |
| 3,333,024 | 7/1967 | Haefele et al. | 260/880 |
| 3,431,224 | 3/1969 | Goldblum | 260/13 |
| 3,437,631 | 4/1969 | Cleveland | 260/37 |
| 3,753,936 | 8/1973 | Marrs | 260/27 R |
| 4,088,711 | 5/1978 | Gergen et al. | 260/873 |

FOREIGN PATENT DOCUMENTS 2329585  1/1975  Fed. Rep. of Germany .

OTHER PUBLICATIONS

Groggins, *Unit Processes in Organic Synthesis*, 4th Ed., McGraw-Hill Book Company, 1952, pp. 616–620.

*Primary Examiner*—Wilbert J. Briggs, Sr.
*Attorney, Agent, or Firm*—Hedman, Gibson, Costigan & Hoare

[57] ABSTRACT

There are provided compositions having superior impact resistance and improved solvent resistance comprising (a) an aromatic polycarbonate resin and (b) a minor amount of a selectively hydrogenated elastomeric block copolymer. The use of component (b) also provides remarkable improvements in the melt flow characteristics, in resistance to brittle failure, and in the resistance to environmental stress crazing and cracking of the polycarbonate resin component (a).

26 Claims, No Drawings

COMPOSITION OF A POLYCARBONATE RESIN AND A SELECTIVELY HYDROGENATED COPOLYMER OF A VINYL AROMATIC COMPOUND AND AN OLEFINIC ELASTOMER

CROSS-REFERENCE TO RELATED APPLICATION

This is a continuation of application Ser. No. 225,102 filed Jan. 14, 1981, now abandoned, which is in turn a continuation-in-part of application Ser. No. 833,364, filed Sept. 14, 1977, now abandoned.

This invention relates to novel resin compositions having superior impact resistance and improved solvent resistance and, more particularly, to polymer compositions comprising an aromatic polycarbonate resin and a minor amount of a selectively hydrogenated elastomeric block copolymer of a vinyl aromatic compound, and an olefinic elastomer alone, or in further combination with a reinforcing agent, a foaming agent and/or pigments, flame retardants, and the like.

BACKGROUND OF THE INVENTION

Aromatic carbonate polymers are well known, commercially available materials having a variety of applications in the plastics art. Such carbonate polymers may be prepared by reacting a dihydric phenol, such as 2,2-bis(4-hydroxyphenyl)propane, with a carbonate precursor, such as phosgene, in the presence of an acid binding agent. See the *Encyclopedia of Polymer Science and Technology*, Vol. 10, pp. 710-764, Interscience, New York, 1969, which is incorporated herein by reference. Generally speaking, aromatic polycarbonate resins offer a high resistance to attack by mineral acids, and they are physiologically harmless as well as stain resistant. In addition, articles molded from such polymers have a high tensile strength and a high impact strength, except in thick sections, a high heat resistance, and a dimensional stability far surpassing that of most other thermoplastic material. However, in certain applications, the use of aromatic polycarbonate resins is limited because (i) they have a high viscosity in the melt, making molding of complex, large, and especially foamed parts difficult; (ii) they exhibit brittleness under sharp impact conditions in thick sections and regardless of thickness when small amounts of reinforcements, e.g., glass or pigments, e.g., titanium dioxide, are added for conventional purposes; and (iii) they exhibit severe environmental stress crazing and cracking. The term "environmental stress crazing and cracking" refers to the type of failure which is hastened by the presence of organic solvents, e.g., acetone, heptane, and carbon tatrachloride, when such solvents are in contact with stressed parts fabricated from aromatic polycarbonate resins. Such contacts may occur, for example, when the solvents are used to clean or degrease stressed parts fabricated from polycarbonates or when such parts are used in automobiles, especially under the hood, as well as in bumpers, which are often subjected not only to impact conditions over a wide temperature range but also subjected to contact with gasoline during refueling.

The relatively high melt viscosities and softening points of aromatic polycarbonates make them difficult to melt process, and, although several approaches have been suggested for improving melt flow, they have disadvantages. For example, plasticizers can be added but other important properties are lost, the parts becoming brittle and losing a substantial amount of their ability to resist distortion by heat. It is suggested in Goldblum, U.S. Pat. No. 3,341,224 that small amounts of polyethylene can be added. While this markedly enhances resistance to environmental stress cracking, low levels of polyethylene are not too effective to enhance melt flow and an increase into effective ranges tends to result in molded articles which delaminate. On the other hand, U.S. Pat. No. 4,088,771 to Gergen et al. suggests the admixing of from about 4 to about 96 parts by weight of a block copolymer and from about 4 to about 96 parts by weight of a polycarbonate so as to form at least partial continuous interlocking networks to provide compositions which exhibit good dimensional stability and integrity. While such compositions exhibit generally good properties where they contain a major proportion of block copolymer, that is, generally from 50 to 75% by weight or more, and even exhibit acceptable properties at the copolymer is reduced to 25% by weight, and even as low as 4% by weight, the advantageous properties thereof are generally reduced or adversely affected in one way or another as the amount of copolymer is reduced. This is especially so with respect to the room temperature impact strength thereof, as well as their resistance to delamination or deterioration when immersed in certain solvents or materials, such as gasoline, in compositions containing, for example, 4% by weight of the copolymer. Consequently, the utilization of such compositions which contain as little as 4% by weight of the copolymer is restricted to a certain extent. For example, shaped articles made of such compositions would have a limited useful life where used in articles subjected to repeated impact at room temperatures. In addition, the usefulness of such a composition in molded articles such as automobile bumpers or trim for automobile bumpers would also be somewhat restricted since such bumpers would be subject to impact at a wide variety of temperatures and, as well, splashing with gasoline, especially when refueling. There exists, therefore, the need for compositions such as those of the instant invention which do not exhibit the above mentioned disadvantages, and the compositions of the present invention fulfill this need.

BRIEF STATEMENT OF THE INVENTION

It has now been discovered that the addition of a minor amount of up to about 3.5 parts by weight of a hydrogenated block copolymer to aromatic polycarbonates causes the melt viscosity to decrease significantly while the heat distortion temperature is substantially unaffected and at the same time provides intimate blend compositions which exhibit excellent room temperature impact strength and improved and excellent resistance to solvent materials, such as, gasoline. In practical terms, the melt flow length of parts molded under standard conditions is significantly increased, and large foamed parts, which are especially difficult to produce with unmodified polycarbonate, are easily produced. The results are surprising because aromatic polycarbonates by themselves have high viscosities which are not too dependent on shear rate and block copolymers by themselves are also high in melt viscosity but are very shear rate dependent. However, after mixing the two, there is now obtained a very substantial reduction in melt viscosity, below that of either component. As has been mentioned, hydrogenated block copolymers of the type to be defined appear to be uniquely suited for this application because while 4% by weight of polyethylene improves the flow of aromatic polycarbonates to the extent of 13% at 300° C., up to about 3.5 parts by weight of a hydrogenated block copolymer improves flow to the extent of 27.5%. In this regard, it is to be noted that while the presence of 3.5 parts by weight of a hydrogenated block copolymer confers much of the desirably advantageous properties mentioned above on aromatic polycarbonates, such an amount is less preferred than 3 parts by weight, which is the optimum amount. Moreover, as the amount of hydrogenated block copolymer is increased beyond 3.5 parts by weight to even an amount as relatively small as 4.0 parts by weight, the beneficial effects and advantages mentioned above that are conferred on aromatic polycarbonates, are not achieved. In fact, the reverse of such effects and advantages occurs.

As previously mentioned, another advantage in adding the hydrogenated block copolymers in amounts up to about 3.5 parts by weight to polycarbonates is the improvement in impact resistance in thick-walled molded articles. Normally, thick walled workpieces formed from aromatic polycarbonates are brittle, even if made from a resin which is entirely satisfactory in thin walls. For example, an Izod impact of 14 ft. lbs/in. notch on a ⅛" thick specimen drops to 2.5 ft. lbs/in. notch as the thickness is only doubled to ¼". Polyolefins, such as are described in U.S. Pat. No. 3,431,224, mentioned above, improve the situation somewhat, but their use is limited above 3% by weight because of a tendency to delaminate, and in any event, the impact strength can be raised only to about 6 ft. lbs./in. notch in ¼" sections, with polyethylene. Surprisingly, it has now been found that only up to about 3.5 parts by weight of a hydrogenated block copolymer is effective to raise the 2.5 ft. lbs./in. notch Izod impact of a ¼" thick specimen all the way up to about 11 ft. lbs/in. notch which is seen to approach the value for a thin-walled, unmodified polycarbonate.

Still, as previously mentioned, an additional advantage in adding hydrogenated block copolymers to polycarbonates in amounts up to about 3.5 parts by weight is to improve their environmental resistance. Thus, the molded parts can be subjected to more strain before cracking starts, without appreciably affecting any other of their desirable properties. Although the above-mentioned U.S. Pat. No. 3,431,244, discloses that polyolefins and other resins are useful for this purpose, and German Patent Publication No. 2,329,585, dated Jan. 2, 1975, discloses the addition of rubbery random polymers and copolymers to enhance certain properties of aromatic polycarbonates, and U.S. Pat. No. 4,088,711 discloses that the addition of from 4% to 96% by weight of the hydrogenated block copolymers to polycarbonates provides compositions which exhibit good dimensional stability and integrity, these same hydrogenated block copolymers have now been found to be excellent and uniquely suitable in minor amounts of up to about 3.5 parts by weight for measurably lengthening the time required for stress cracking of parts under stress, e.g., by immersion in aggressive solvents, such as gasoline and carbon tetrachloride and, as well, providing improved impact strength, especially at room temperature.

The new compositions may also be reinforced, e.g., with fibrous glass, and rendered flame retardand either by using a halogenated aromatic polycarbonate as all or part of component (a), and/or by using flame retardant additives, or they may be pigmented, and/or foamed by known procedures to extend their field of use in melt processed products.

In comparison with the compositions of prior art, they will in general also have high stiffness and strength, excellent surface appearance, and excellent resistance to discoloration by heat.

DESCRIPTION OF THE INVENTION

According to the present invention, there are provided high impact strength thermoplastic compositions comprising an intimate blend of:
(a) an aromatic polycarbonate resin with
(b) a minor amount of up to about 3.5 parts by weight of a selectively hydrogenated linear, sequential, or radical teleblock copolymer of a vinyl aromatic compound $(A)_n$ and $(A^1)_n$ and an olefinic elastomer (B), of the type $A-B-A^1$; $A-(B-A-B)_n-A$; $A(BA)_nB$; $(A)_4B$; $B(A)_4$; or $B[(AB)_nB]_4$, wherein n is an integer of 1 to 10.

Preferred compositions will be those in which component (a) comprises from about 99.5 to about 97 parts by weight and component (b) comprises from about 0.5 to about 3.0 parts by weight, based on the total weight of components (a) and (b). In further preferred compositions, component (a) comprises from 97 to 98 parts by weight and component (b) comprises from 3.0 to 2 parts by weight, based on the total weight of (a) and (b).

In preferred compositions, the aromatic polycarbonate component (a) will be an aromatic polycarbonate of a dihydric phenol and a carbonate precursor such as phosgene, a haloformate, or a carbonate ester. Generally speaking, such carbonate polymers may be typified as possessing recurring structural units of the formula

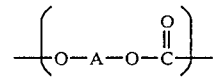

wherein A is a divalent aromatic radical of the dihydric phenol employed in the polymer producing reaction. Preferably, the carbonate polymers used to provide the resinous component (a) have an intrinsic viscosity (as measured in p-dioxane in deciliters per gram at 30° C.) ranging from about 0.35 to about 0.75. The dihydric phenols which may be employed to provide such aromatic polycarbonate polymers are mononuclear and polynuclear aromatic compounds, containing as functional groups, 2 hydroxyl radicals, each of which is attached directly to a carbon atom of an aromatic nucleus. Illustrative dihydric phenols are 2,2-bis-(4-hydroxyphenyl)propane (Bisphenol-A); hydroquinone; resorcinol; 2,2-bis-(4-hydroxyphenyl)pentane; 2,4'-dihydroxydiphenyl methane; bis-(2-hydroxyphenyl)methane; bis-(4-hydroxyphenyl)methane; bis-(4-hydroxy-5-nitrophenyl)methane; 1,1-bis-(4-hydroxyphenyl)ethane; 3,3-bis-(4-hydroxyphenyl)pentane; 2,2'-dihydroxy-diphenyl; 2,6-dihydroxy naphthalene; bis-(4-hydroxyphenyl sulfone); 2,4'-dihydroxy diphenyl) sulfone; 5'-chloro-2,4'-dihydroxydiphenyl sulfone; bis-(4-hydroxyphenyl)diphenyl sulfone; 4,4'-dihydroxy-diphenyl ether; 4,4'-dihydroxy-3,3'-dichlorodiphenyl ether; 4,4'-dihydroxy-2,5-diethoxydiphenyl ether; 2,2-bis-(3,5-dichloro-4-hydroxyphenyl)propane; 2,2-bis-(3,5-dibromo-4-hydroxyphenyl)propane; 2,2-bis-(3,5-dimethyl-4-hydroxy phenyl)propane; and the like.

A variety of additional dihydric phenols which may be employed to provide such carbonate polymers are disclosed in Goldberg, U.S. Pat. No. 2,999,835. It is, of course, known to employ two or more different dihydric phenols or a dihydric phenol in combination with a glycol, a hydroxy terminated polyester, or a dibasic acid in the event that a carbonate copolymer rather than a homopolymer, e.g., bisphenol-A and tetrabromobisphenol-A with flame retardant properties, is desired for use as component (a) in the compositions of this invention.

When a carbonate ester is used as the carbonate precursor in the polymer forming reaction, the materials are reacted at temperatures of from 100° C. or higher for times varying from 1 to 15 hours. Under such conditions, ester interchange occurs between the carbonate ester and the dihydric phenol used. The ester interchange is advantageously consummated at reduced pressures of the order of from about 10 to about 100 mm of mercury, preferably in an inert atmosphere, such as nitrogen or argon, for example.

Although the polymer forming reaction may be conducted in the absence of a catalyst, one may, if desired, employ the usual ester exchange catalysts, such as, for example, metallic lithium, potassium, calcium, and magnesium. Additional catalysts and variations in the exchange methods are discussed in Groggins, *Unit Processes in Organic Synthesis*, (4th edition, McGraw-Hill Book Company, 1952), pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di(tolyl) carbonate.

A preferred method for preparing the carbonate polymers suitable for use in providing the compositions of the present invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylaniline, quinoline, etc.). The acid acceptor may be used undiluted or diluted with inert organic solvents as, for example, methylene chloride, chlorobenzene, or 1,2-dichloroethane. Tertiary amines are advantageous since they are good solvents as well as acid acceptors during the reaction.

The temperature at which the carbonyl halide reaction proceeds may vary from below 0° C. to above 100° C. The reaction proceeds satisfactorily at temperatures from room temperature (25° C.) to 0° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the polycarbonate resin compositions of the invention comprises adding phosgene to an alkaline aqueous suspension of the dihydric phenol used. This is preferably done in the presence of inert solvents such as methylene chloride, 1,2-dichloroethane, and the like. Quaternary ammonium compounds may be employed to catalyze the reaction.

A fourth method for preparing such carbonate polymers involves the phosgenation of an agitated suspension of the anhydrous alkali salts of the dihydric phenol used in a non-aqueous medium such as benzene, chlorobenzene, and toluene. This reaction is illustrated by the addition of phosgene to a slurry of the sodium salt of 2,2-bis-(4-hydroxyphenyl)-propane in an inert polymer solvent such as chlorobenzene. The organic solvent should preferably be a polymer solvent but need not necessarily be a good solvent for the reactants.

Generally speaking, a haloformate such as the bishaloformate of 2,2-bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer non-solvent, such as heptane or isopropanol. Alternatively, the polymer solution may be heated to evaporate the solvent.

With respect to component (b), the hydrogenated block copolymers are made by means known in the art and they are commercially available.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, α-methyl styrene, vinyl xylene, ethyl vinyl xylene, vinyl naphthalene, and the like, or mixtures thereof. The end blocks (A) and ($A^1$), may be the same or different. They are preferably selected from styrene, α-methyl styrene, vinyl toluene, vinyl xylene, vinyl naphthalene, especially styrene. The center block (B) may be derived from, for example, butadiene, isoprene, 1,3-pentadiene, 2,3,dimethyl butadiene, and the like, and it may have a linear, sequential or teleradial structure.

The selectively hydrogenated linear block copolymers are described by Haefele et al., U.S. Pat. No. 3,333,024, which is incorporated herein by reference.

The ratio of the copolymers and the average molecular weights can vary broadly although the molecular weight of center block B should be greater than that of the combined terminal blocks. It is preferred to form terminal blocks A having average molecular weights of 2,000 to 100,000 and center block B, e.g., a hhdrogenated polybutadiene block, with an average molecular weight of 25,000 to 1,000,000. Still more preferably, the terminal blocks have average molecular weights of 8,000 to 60,000 while the hydrogenated polybutadiene polymer block has an average molecular weight of between 50,000 and 300,000. The terminal blocks will preferably comprise 2 to 60% by weight, or more, preferably 15 to 40% by weight, of the total block polymer. The preferred copolymers will be those formed from a copolymer having a hydrogenated/saturated polybutadiene center block wherein 5 to 55%, or more, preferably 30 to 50%, of the butadiene carbon atoms, are vinyl side chains.

The hydrogenated copolymers will have the average unsaturation reduced to less than 20% of the original value. It is preferred to have the unsaturation of the center block B reduced to 10%, or less, preferably 5%, of its original value.

The block copolymers are formed by techniques well known to those skilled in the art. Hydrogenation may be conducted utilizing a variety of hydrogenation catalysts such as nickel or kieselguhr, Raney nickel, coppor chromate, molybdenum sulfide, or finely divided platinum or other nobel metals on a low surface area carrier.

Hydrogenation may be conducted at any desired temperature or pressure, from atmospheric to 300 psig, the usual range being between 100 to 1,000 psig at temperatures from 75° F. to 600° F. for times between 0.1 to 24 hours, preferably from 0.2 to 8 hours.

Hydrogenated block copolymers such as Kraton G 6500, Kraton G 1650, Kraton G 1652, and Kraton G 1651 from Shell Chemical Company, Polymers Division, have been found usable according to the present invention. Kraton G 1650 and Kraton G 1651 are preferred. Also usable are the so-called hydrogenated Solprenes of Phillips, especially the product designated Solprene 512.

The radial teleblock copolymers of which the Solprenes are typical examples can be characterized as having at least three polymer branches with each branch of the radial block polymer comprising terminal non-elastomeric segments, e.g., (A) and ($A^1$) as defined hereinabove. The branches of the radial block polymer contain a terminal non-elastomeric segment attached to an elastomeric polymer segment, e.g., (B) as defined above. These are described in Marrs, U.S. Pat. No. 3,753,936 and in Zelinski, U.S. Pat. No. 3,281,383, both of which are incorporated herein by reference, and they are selectively hydrogenated by procedures known per se. In any event, the term "selective hydrogenation" is used herein to contemplate polymers in which the elastomeric blocks (B) have been hydrogenated, but the non-elastomeric blocks (A) and ($A^1$) have been left unhydrogenated, i.e., aromatic.

As is mentioned above, other additives may be present in the compositions, such as pigments, e.g., titanium dioxide, flame retardants, foaming agents, e.g., 5-phenyltetrazole, etc., and the like, in amounts varying between about 0.1 and 100 parts by weight of the total resinous components (a) and (b) in the composition.

Among the preferred features of this invention are reinforced compositions containing reinforcing amounts of reinforcements, such as powders, whiskers, fibers, or platelets of metals, e.g., aluminum, bronze, iron or nickel, and non-metals, e.g., carbon filaments, acicular $CaSiO_3$, asbestos, $TiO_2$, titanate whiskers, glass flakes, and the like. Such reinforcements will be present in an amount of, e.g., 0.1 to 60% by weight, preferably 5 to 40% by weight. Especially preferred as a reinforcement is fibrous glass.

The method of forming the polymer composition is not critical. Any prior art blending technique is generally suitable. The preferred method comprises blending the polymers and additives, such as reinforcements in powder, granular and filamentous form—as the case may be—extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of an aromatic polycarbonate resin, and up to about 3.5 parts by weight of a selectively hydrogenated elastomeric vinyl aromatic olefinic A-B-$A^1$ block copolymer are illustrated in the following examples which are set forth as further description of the invention, but are not to be construed as limiting the invention thereto.

The following formulatons are produced by a general procedure comprising mechanically blending the components then predried for 4 hours at 125° C., and then extruding in a twin screw Werner Pfleiderer (WP) extruder at 300° C. After extrusion the materials were dried for 4 hours at 125° C., before being molded into test pieces in a reciprocating screw injection molding machine at 260° to 320° C. (cylinder) and 20° C. to 115° C. (mold). To make foamable compositions, the pelletized extrudate is dry blended with 5-phenyl tetrazole, 0.25 parts per hundred of (a) and (b). And foam molding is carried out in a Siemag unit with a plasticizer/acumulator. All conditions are standard for polycarbonate per se. All of the polycarbonate components contained a small amount, e.g., 0.1% by weight of a stabilizer combination, i.e., conventional phosphite/hindered phenol. The physical tests are carried out by the following procedures: notched Izod impact strength on $\frac{1}{4}''$ and $\frac{1}{8}''$ specimens; falling dart impact tests on $\frac{1}{8}''$ disc specimens; tensile strength and modulus; flexural strength and modulus; heat distortion temperatures; and apparent melt viscosity at 1500 sec.$^{-1}$ and 300° C., and in the case of foams, Gardner impact and Charpy impact. Formulations made and physical properties on molded pieces are as follows:

EXAMPLES 1 AND 2

Compositions were prepared, molded, and tested. The composition components and test results were as follows:

TABLE 1

| Example | A* | 1** | B*** | C* | 2** | D*** |
|---|---|---|---|---|---|---|
| Composition (parts by weight) | | | | | | |
| (a) poly-(2,2-diphenylpropane carbonate)$^a$ | 100 | 97 | 96 | 95 | 93 | 91 |
| (b) hydrogenated styrene-butadiene-styrene block copolymer$^b$ | — | 3 | 4 | — | 2 | 4 |
| (c) glass fiber reinforcement | — | — | — | 5 | 5 | 5 |
| Melt Viscosity (300° C.; 1500s$^{-1}$) (Pa.s) | 300 | 260 | 250 | 330 | 290 | 270 |
| Heat dist. temp. at 266 psi (°C.) | 139 | 137 | 137 | 141 | 140 | 139 |
| Izod Notched Impact | | | | | | |
| $\frac{1}{8}''$ at 23° C. (ft. lbs/in. notch) | 12.7 | 12.2 | 11.3 | 2.06 | 8.4 | 7.8 |
| $\frac{1}{8}''$ at −25° C. (ft. lbs/in. notch) | 1.88 | 4.7 | 6.65 | 1.68 | 2.8 | 3.0 |
| $\frac{1}{4}''$ at 23° C. (ft. lbs/in. notch) | 1.88 | 9.35 | 9.35 | 1.88 | 3.2 | 3.20 |
| $\frac{1}{8}''$ Ductile-Brittle Transition (°C.) | 0 | −15 | −20 | >35 | 0 | 0 |
| Izod Notched Impact (after aging) | | | | | | |
| $\frac{1}{8}''$ 24 hrs. at 120° C. (ft. lbs/in. notch) | 2.25 | 11.6 | 11.9 | 2.25 | 7.45 | 7.30 |
| $\frac{1}{8}''$ 100 hrs. at 120° C. (ft. lbs/in. notch) | 1.88 | 11.6 | 11.3 | 1.50 | 2.06 | 2.06 |
| Falling Dart Impact (10 kg dart; 10 cm $\phi$ disc) | | | | | | |

TABLE 1-continued

| Example | A* | 1** | B*** | C* | 2** | D*** |
|---|---|---|---|---|---|---|
| w = 3.2 mm: | | | | | | |
| at 23° C. (kg/m) | >20 | >20 | >20 | 18.3 | >20 | >20 |
| at −35° C. (kg/m) | >20 | >20 | >20 | — | — | — |
| Chemical Resistance (0.3% strain; ASTM tensile bars) immersion in: | | | | | | |
| CCl₄ (time to failure) | <10 sec | ≧30 min | ≧45 min | <10 sec | >30 min | >30 min |
| Chevron Petrol (gasoline), (time to failure) | <30 sec | >30 min | >60 min | <30 sec | >30 min | >30 min |
| Chemical Resistance (dipping ⅛" bars in petrol, 20 min. per 24 hrs.) Retained Izod Notched Impact | | | | | | |
| 1 cycle (ft. lbs/in. notch) | <0.6 | 11.4 | 11.6 | — | — | — |
| 3 cycles (ft. lbs/in. notch) | — | 11.0 | 11.3 | — | — | — |
| 5 cycles (ft. lbs/in. notch) | — | 10.8 | 10.8 | — | — | — |
| 7 cycles (ft. lbs/in. notch) | — | 10.8 | 10.5 | — | — | — |
| Unnotched Izod Impact, ⅛" bars at 23° C. (ft. lbs/in.) | no break | no break | no break | no break | no break | no break |

*Control
**Within scope of this invention
***Outside scope of this invention but within scope of U.S Pat. No. 4,088,711
$^a$Lexan 121-111, available from General Electric Co.
$^b$Kraton G 1651, available from Shell Chemical Co.

The above data clearly establish that the room temperature impact strengths on ⅛" thick samples of compositions according to the instant invention and which contain 3 parts per hundred of block copolymer or 2 parts of block copolymer plus a reinforcement amount of glass fiber, are better than the compositions which contain no copolymer or 4 parts of block copolymer as called for in U.S. Pat. No. 4,088,711, with or without fiber-glass reinforcement. The data further show that the unreinforced composition containing 3 parts per hundred of block copolymer according to this invention has better resistance to immersion in gasoline over the long term than the corresponding compositions containing 4 parts per hundred of block copolymer as called for in U.S. Pat. No. 4,088,711. In addition, the data above clearly establish that 3 parts of the block copolymer is sufficient to give a vast improvement in processability, as measured by melt viscosity, coupled with little or no decrease in HDT as compared to the polycarbonate controls.

EXAMPLE 3

A composition was prepared using a higher molecular weight polycarbonate and compared to a control composition having no block copolymer. The composition components and test results were as follows:

TABLE 2

| Example | 3 | 3A* |
|---|---|---|
| Composition (parts by weight) | | |
| (a) poly-(2,2-diphenylpropane carbonate)$^a$ | 96.5 | 100 |
| (b) hydrogenated styrene-butadiene-styrene block copolymer$^b$ | 3.5 | — |
| Melt Viscosity (300° C.; 1500s⁻¹) (Pa.s) | 305 | 420 |
| Heat dist. temp at 266 psi (°C.) | 139.5 | 141 |
| Izod Notched Impact | | |
| ⅛" at 23° C. (ft. lbs/in. notch) | 16.6 | 16.8 |
| ⅛" at −30° C. (ft. lbs/in. notch) | 6.2 | 2.9 |
| ¼" at 23° C. (ft. lbs/in. notch) | 11.8 | 2.4 |
| ⅛" Ductile-Brittle Transition (°C.) | −27.5 | −10 |
| Izod Notched Impact (after aging) | | |
| ⅛" 24 hrs at 120° C. (ft. lbs/in. notch) | 15.6 | 2.8 |
| ⅛" 100 hrs. at 120° C. (ft. lbs/in. notch) | 13.4 | 2.3 |
| Falling Dart Impact (10 kg dart; 10 cm φ disc) | | |
| w = 3.2 mm: | | |
| at 23° C. (kg/m) | >20 | >20 |
| at −35° C. (kg/m) | >20 | >20 |
| Chemical Resistance (0.3% strain; ASTM tensile bars) immersion in: | | |
| Chevron Petrol (gasoline), (time to failure) | >60 min | <½ min |
| Retention of tensile strength (N/mm²) | 57.0 | 6.2 |
| Retention of Eb ultimate strain after 1 min. dipping (24 hrs. drying) | 7.7 | 1.0 |
| Chemical Resistance (dipping ⅛" bars in petrol, 20 min. per 24 hrs.) Retained Izod Notched Impact | | |
| 1 cycle (ft. lbs/in. notch) | 16.2 | 1.6 |
| 3 cycles (ft. lbs/in. notch) | 16.2 | — |
| 5 cycles (ft. lbs/in. notch) | 16.0 | — |
| 7 cycles (ft. lbs/in. notch) | 15.8 | — |
| Unnotched Izod Impact, ⅛" bars at 23° C. (ft. lbs/in.) | no break | no break |

*Control
$^a$Lexan 100, available from General Electric Co.
$^b$Kraton G 1651, available from Shell Chemical Co.

The conclusions derived from the data in the previous Examples are substantiated.

EXAMPLE 4

A glass reinforced composition was prepared and compared to a control composition having no block copolymer. The components of the compositions and the testing results were as follows:

TABLE 3

| Example | 4 | 4A* |
|---|---|---|
| Composition (parts by weight) | | |
| (a) poly-(2,2-diphenylpropane carbonate)$^a$ | 96.5 | 98.5 |
| (b) hydrogenated styrene-butadiene-styrene block copolymer$^b$ | 2.0 | — |
| (c) glass fiber reinforcement | 1.5 | 1.5 |
| Melt Viscosity (300° C.; 1500s⁻¹) (Pa.s) | 339 | 427 |
| Heat dist. temp. at 266 psi (°C.) | 140 | 141 |
| Izod Notched Impact | | |
| ⅛" at 23° C. (ft. lbs/in. notch) | 11.8 | 2.5 |
| ⅛" at −5° C. (ft. lbs/in. notch) | 3.4 | 2.3 |
| ¼" at 23° C. (ft. lbs/in. notch) | 3.1 | 1.05 |
| ⅛" Ductile-Brittle Transition (°C.) | 15 | >25 |
| Izod Notched Impact (after aging) | | |
| ⅛" 24 hrs. at 120° C. (ft. lbs/in. notch) | 6.4 | 1.7 |
| ⅛" 100 hrs. at 120° C. (ft. lbs/in. notch) | 6.2 | 1.5 |
| Falling Dart Impact (10 kg dart; 10 cm φ disc) | | |
| w = 3.2 mm: | | |
| at 23° C. (kg/m) | >20 | >20 |
| at −35° C. (kg/m) | >20 | >20 |
| Chemical Resistance (0.3% strain; ASTM tensile bars) immersion in: | | |
| Chevron Petrol (gasoline), (time to failure) | >30 min | <½ min |
| Retention of tensile strength (N/mm²) | 63.0 | 23.6 |

TABLE 3-continued

| Example | 4 | 4A* |
|---|---|---|
| Retention of Eb ultimate strain after 1 min. dipping (24 hrs. drying) | 7.5 | 2.0 |
| Chemical Resistance (dipping ⅛" bars in petrol, 20 min per 24 hrs.) Retained Izod Notched Impact | | |
| 1 cycle (ft. lbs/in. notch) | 10.4 | 1.4 |
| 3 cycles (ft. lbs/in. notch) | 8.4 | 1.1 |
| 5 cycles (ft. lbs/in. notch) | 7.7 | 0.9 |
| 7 cycles (ft. lbs/in. notch) | 7.2 | 0.7 |
| Unnotched Izod Impact, ⅛" bars at 23° C. (ft. lbs/in.) | no break | no break |

*Control
[a]Lexan 100, available from General Electric Co.
[b]Kraton G 1651, available from Shell Chemical Co.

Again, the conclusions derived from the data in the previous Examples are substantiated. It is also to be noted that the serious embrittling effects of glass on both thick and thin walls is reversed.

EXAMPLE 5

A pigmented composition according to the invention and a control composition having no copolymer were prepared. The components of the compositions and the results of the testing were as follows:

TABLE 4

| Example | 5 | 5A* |
|---|---|---|
| Composition (parts by weight) | | |
| (a) poly-(2,2-diphenylpropane carbonate)[a] | 97.5 | 98 |
| (b) hydrogenated styrene-butadiene-styrene block copolymer[b] | 0.5 | — |
| (c) pigment, titanium dioxide | 2 | 2 |
| Melt Viscosity (300° C.; 1500s$^{-1}$) (Pa.s) | 380 | 405 |
| Heat dist. temp. at 266 psi (°C.) | 140 | 140 |
| Izod Notched Impact | | |
| ⅛" at 23° C. (ft. lbs/in. notch) | 18.3 | 3.4 |
| ⅛" at 0° C. (ft. lbs/in. notch) | 5.8 | 2.8 |

TABLE 4-continued

| Example | 5 | 5A* |
|---|---|---|
| ¼" at 23° C. (ft. lbs/in. notch) | — | — |
| ⅛" Ductile-Brittle Transition (°C.) | 5 | >25 |
| Izod Notched Impact (after aging) | | |
| ⅛" 24 hrs. at 120° C. (ft. lbs/in. notch) | 2.6 | 1.4 |
| ⅛" 100 hrs. at 120° C. (ft. lbs/in. notch) | 2.5 | 1.4 |
| Falling Dart Impact (10 kg. dart 10 cm φ disc) w = 3.2 mm: | | |
| at 23° C. (kg/m) | >20 | >20 |
| at −35° C. (kg/m) | >20 | >20 |
| Chemical Resistance (0.3% strain; ASTM tensile bars) immersion in: | | |
| Chevron Petrol (gasoline), (time to failure) | >60 min. | >1 min. |
| Retention of tensile strength (N/mm$^2$) | 59.3 | 28.3 |
| Retention of Eb ultimate strain after 1 min. dipping (24 hrs. drying) | 7.6 | 2.1 |
| Chemical Resistance (dipping ⅛" bars in petrol, 20 min. per 24 hrs.) Retained Izod Notched Impact | | |
| 1 cycle (ft. lbs/in. notch) | 18.2 | 0.8 |
| 3 cycles (ft. lbs/in. notch) | 17.9 | 0.8 |
| 5 cycles (ft. lbs/in. notch) | 17.5 | 0.7 |
| 7 cycles (ft. lbs/in. notch) | 17.1 | 0.7 |
| Unnotched Izod Impact ⅛" bars at 23° C. (ft. lbs/in.) | no break | no break |

*Control
[a]Lexan 100, available from General Electric Co.
[b]Kraton G 1651, available from Shell Chemical Co.

Once more the conclusions derived from the data in the previous Examples are substantiated. The flow properties and the impact strength of the composition of this invention are improved with no loss in other important properties.

EXAMPLE 6

A reinforced, flame retardant, foamed composition was prepared, molded, and compared against a corresponding control composition. The composition components and test results were as follows:

TABLE 5

| Example | | 6 | 6A* |
|---|---|---|---|
| Composition (parts by weight) | | | |
| (a) poly-(2,2-diphenylpropane carbonate)[a] | | 96 | 98 |
| (b) hydrogenated styrene-butadiene-styrene block copolymer[b] | | 2 | — |
| (c) glass fiber reinforcement | | 2 | 2 |
| (d) trichlorobenzene-sulfonic acid, sodium salt, flame retardant | | 0.8 | 0.8 |
| (e) 5-phenyltetrazole foaming agent | | 0.25 | 0.25 |
| Melt Viscosity (300° C.; 1500s$^{-1}$) (Pa.s) | as solid | 342 | 427 |
| Heat dist. temp. at 266 psi (°C.) | as foamed | 125 | 126 |
| Izod Notched Impact | | | |
| ⅛" at 23° C. (ft. lbs/in. notch) | as solid | 13.1 | 3.0 |
| ⅛" at −5° C. (ft. lbs/in. notch) | as solid | 3.9 | 2.6 |
| ¼" at 23° C. (ft. lbs/in. notch) | as foamed | 6.6 | 1.6 |
| ⅛" Ductile-Brittle Transition (°C.) | as solid | 5 | >23 |
| Izod Notched Impact (after aging) | | | |
| ⅛" 24 hrs. at 120° C. (ft. lbs/in. notch) | as solid | 7.9 | 1.6 |
| ⅛" 100 hrs. at 120° C. (ft. lbs/in. notch) | as solid | 6.2 | 1.5 |
| ¼" 24 hrs. at 120° C. (ft. lbs/in. notch) | as foamed | 5.6 | 1.3 |
| ¼" 100 hrs. at 120° C. (ft. lbs/in. notch) | as foamed | 4.1 | 1.1 |
| Falling Dart Impact (10 kg. dart; 10 cm φ disc) w = 3.2 mm: | | | |
| at 23° C. (kg/m) | as solid | >20 | >20 |
| at −35° C. (kg/m) | as solid | >20 | >20 |
| w = 6 mm: | | | |
| at 23° C. (kg/m) | as foamed | 8.5 | 4.5 |
| at −35° C. (kg/m) | as foamed | 8.0 | 4.0 |
| Chemical Resistance (0.3% strain; ASTM tensile bars) immersion in: | | | |
| Chevron Petrol (gasoline), (time to failure) | as solid | >30 min. | <0.5 min. |
| Retention of tensile strength (N/mm$^2$) | as solid | 58.0 | 30.1 |

TABLE 5-continued

| Example | | 6 | 6A* |
|---|---|---|---|
| Retention of Eb ultimate strain after 1 min. dipping (24 hrs. drying) | as solid | 7.5 | 2.2 |
| Chemical Resistance (dipping ⅛" bars in petrol, 20 min per 24 hrs.) Retained Izod Notched Impact | | | |
| 1 cycle (ft. lbs/in. notch) | as solid | 10.5 | 2.3 |
| 3 cycles (ft. lbs/in. notch) | as solid | 8.7 | 2.2 |
| 5 cycles (ft. lbs/in. notch) | as solid | 8.6 | 1.7 |
| 7 cycles (ft. lbs/in. notch) | as solid | 8.1 | 1.5 |
| Unnotched Izod Impact | | | |
| ⅛" bars at 23° C. (ft. lbs/in.) | as solid | no break | no break |
| ¼" bars at 23° C. (ft. lbs/in.) | as foamed | no break | 11.1 |
| Gardner impact, 6 mm discs (in. lbs.) | as foamed | 105 | 65 |
| Charpy impact (kgfcm/cm²) | as foamed | no break | 31.0 |

*Control
[a]Lexan 100, available from General Electric Co.
[b]Kraton G 1651, available from Shell Chemical Co.

Because of the improved processability, large parts, e.g., 3 to 4 kilograms in weight, having optimum density, 0.7 to 0.9 gm/cc³, are foamed from the composition of this invention, and they have superior glossy surfaces. Typical characteristics for structural foam molding are long dwell times and high temperatures which are necessary for flowability requirements. This consequently lease to severe technical problems, caused by polymer breakdown when chemical blowing agents are present. The example according to this invention overcomes these problems in all respects.

EXAMPLES 7 TO 10

A series of compositions were prepared and molded, and the environmental stress cracking was determined under flexural load with 0.25% strain after immersion in carbon tetrachloride by procedures known per se. The test results were as follows:

TABLE 6

| Example | 7 | 7A* | 8 | 9 | 9A* | 10 |
|---|---|---|---|---|---|---|
| (a) poly-(2,2-diphenylpropane carbonate)[a] | 98 | 100 | 97 | — | — | — |
| (b) poly-(2,2-diphenylpropane carbonate)[b] | — | — | — | 98 | 100 | 96.5 |
| (c) hydrogenated styrene-butadiene-styrene block copolymer[c] | 2 | — | 3 | 2 | — | 3.5 |
| Properties | | | | | | |
| Crack initiation after | 45 sec. | 31 sec. | >10 min. | >12 min. | 45 sec. | >>12 min. |
| Catastrophic crack after | >10 min. | 1 min. | >10 min. | >12 min. | 50 sec. | >>12 min. |

*Control
[a]Lexan 121, available from General Electric Co.
[b]Lexan 101, available from General Electric Co.
[c]Kraton G 1650, available from Shell Chemical Co.

The compositions of this invention are seen to show a significant improvement of stress crack resistance.

In another test, DIN tensile bars molded from each of compositions 7 and 7A were put under constant tensile deformations of 2.8% for 24 hours. The sample 7A showed many crazes, whereas no crazes were shown by Example 7, demonstrating superior resistance to stress relaxation in environmental air.

EXAMPLE 11

A composition according to Example 1 [97 parts of poly-(2,2-diphenylpropane carbonate) and 3 parts of hydrogenated (styrene-butadiene-styrene block copolymer] was molded into ⅛" discs and subjected to a falling dart impact test. The discs were then tested for environmental stress crack resistance with the following results:

| Immersion in | Effect |
|---|---|
| Carbon tetrachloride | no break, only small crazes after long immersion times. |
| Gasoline (Super Petrol) | no break, almost no crazes even afrer very long immersion times. |

EXAMPLE 12

A flame retardant, foamed, glass reinforced composition, according to Example 6, was molded into test bars and immersed in gasoline (Super Petrol). The maximum flexural strength was determined as a function of time out to 50 minutes and was compared with that of bars molded from foamed polycarbonate controls. Initially, both bars had a maximum flexural strength of 630 kgf/cm². The maximum flexural strength of the control decreased to 105 within 2 minutes and stabilized. The composition according to this invention decreased to 250 kgf/cm² slowly, during 20 minutes, and did not fall below this value, even out to 50 minutes immersion time.

From the foregoing data, it can be seen that the addition of block copolymers to aromatic polycarbonates promotes ductile instead of brittle deformation in high wall thickness.

The same type of beneficial ductile deformation made is achieved also with pigmented and glass reinforcements, which are notorious for their embrittlement of aromatic polycarbonates.

Flame retardant modifications which also are not brittle have been produced and are superior when foamed.

The environmental stress crack resistance is drastically improved for solids as well as for foams.

We claim:

1. A thermoplastic composition having superior resistance to impact fracture in thick-walled molded articles and improved environmental solvent resistance comprising an intimate blend of:
   (a) an aromatic polycarbonate resin; and
   (b) up to 3.5 parts by weight, based on 100 parts by weight of components (a) and (b) combined, of a selectively hydrogenated linear copolymer of a vinyl aromatic compound $(A)_n$ and $(A^1)_n$ and an olefinic elastomer (B), of the type $A-B-A^1$, wherein n is an integer from 1 to 10.

2. A composition as defined in claim 1, wherein component (a) comprises from 99.5 to 96.5 parts by weight and component (b) comprises from 0.5 to 3.5 parts by weight, based on the total weight of components (a) and (b).

3. A composition as defined in claim 1, wherein component (a) comprises from 99.5 to about 97 parts by weight and component (b) comprises from 0.5 to about 3 parts by weight, based on the total weight of components (a) and (b).

4. A composition as defined in claim 1, wherein component (a) is an aromatic polycarbonate of a dihydric phenol and a carbonate precursor.

5. A composition as defined in claim 4, wherein said aromatic polycarbonate is a polycarbonate of bisphenol-A.

6. A composition as defined in claim 1, wherein, in component (b), (A) and $(A^1)$ are selected from the group consisting of styrene, α-methyl styrene, vinyl toluene, vinyl xylene, and vinyl naphthalene and (B) is selected from the group consisting of butadiene, isoprene, 1,3-pentadiene, and 2,3-dimethylbutadiene.

7. A composition as defined in claim 6, wherein, in component (b), (A) is a styrene block, (B) is an olefin block, and $(A^1)$ is a styrene block.

8. A composition as defined in claim 7, wherein in component (b), terminal blocks (A) and $(A^1)$ have molecular weight of 2,000 to 100,000, respectively, and center block (B) has a molecular weight of from 25,000 to 1,000,000.

9. A reinforced composition as defined in claim 1 including a reinforcing amount of a reinforcing filler.

10. A composition as defined in claim 9, wherein said reinforcing agent comprises glass fibers.

11. A composition as defined in claim 9 which contains a flame retardant.

12. A composition as defined in claim 1 which contains a flame retardant.

13. A composition as defined in claim 1 which also includes a minor, effective amount of a foaming agent.

14. A composition as defined in claim 9 which also includes a minor, effective amount of a foaming agent.

15. A composition as defined in claim 1 which also includes a small, effective amount of a pigment.

16. A composition as defined in claim 15, wherein said pigment is titanium dioxide.

17. A thermoplastic composition comprising an intimate blend of:
   (a) 97 parts by weight of poly-(2,2-diphenylpropane carbonate); and
   (b) 3 parts by weight of hydrogenated styrene-butadiene-styrene block copolymer.

18. A thermoplastic composition comprising an intimate blend of:
   (a) 95 parts by weight of poly-(2,2-diphenylpropane carbonate);
   (b) 3 parts by weight of hydrogenated styrene-butadiene-styrene block copolymer; and
   (c) titanium dioxide pigment.

19. A thermoplastic composition having superior resistance to impact fracture in thick-walled molded articles and improved environmental solvent resistance comprising an intimate blend of:
   (a) an aromatic polycarbonate resin; and
   (b) up to about 3.0 parts by weight, based on 100 parts by weight of components (a) and (b) combined, of a selectivity hydrogenated linear copolymer of a vinyl aromatic compound $(A)_n$ and $(A^1)_n$ and an olefinic elastomer (B), of the type $A-B-A^1$, wherein n is an integer from 1 to 10.

20. A composition as defined in claim 19, wherein component (a) comprises from 99.5 to about 97 parts by weight and component (b) comprises from 0.5 to about 3 parts by weight, based on the total weight of components (a) and (b).

21. An article molded to shape from the composition of claim 1.

22. An article molded to shape from the composition of claim 9.

23. An article molded to shape from the composition of claim 12.

24. An article molded to shape from the composition of claim 13.

25. An article molded to shape from the composition of claim 15.

26. An article molded to shape from the composition of claim 19.

* * * * *